United States Patent
Vogt

(10) Patent No.: US 7,057,551 B1
(45) Date of Patent: Jun. 6, 2006

(54) ELECTRONIC EXERCISE MONITOR AND METHOD USING A LOCATION DETERMINING COMPONENT AND A PEDOMETER

(75) Inventor: Mark J. Vogt, Mission, KS (US)

(73) Assignee: Garmin Ltd. (KY)

(*) Notice: Subject to any disclaimer, the term of this patent is extended or adjusted under 35 U.S.C. 154(b) by 3 days.

(21) Appl. No.: 10/832,865

(22) Filed: Apr. 27, 2004

(51) Int. Cl.
G01S 5/14 (2006.01)
G01C 21/20 (2006.01)

(52) U.S. Cl. .......................... 342/357.06; 342/357.14; 701/216

(58) Field of Classification Search ........... 342/357.06, 342/357.14; 701/216
See application file for complete search history.

(56) References Cited

U.S. PATENT DOCUMENTS

| | | | |
|---|---|---|---|
| 5,148,002 A | 9/1992 | Kuo et al. | |
| 5,406,491 A | 4/1995 | Lima | |
| 5,583,776 A | 12/1996 | Levi et al. | |
| 5,687,136 A | 11/1997 | Borenstein | |
| 6,009,375 A * | 12/1999 | Sakumoto et al. | 701/216 |
| 6,024,655 A | 2/2000 | Coffee | |
| 6,064,942 A | 5/2000 | Johnson et al. | |
| 6,067,046 A | 5/2000 | Nichols | |
| 6,122,960 A | 9/2000 | Hutchings et al. | |
| 6,132,391 A * | 10/2000 | Onari et al. | 600/595 |
| 6,182,010 B1 | 1/2001 | Berstis | |
| 6,204,807 B1 * | 3/2001 | Odagiri et al. | 342/357.06 |
| 6,251,048 B1 | 6/2001 | Kaufman | |
| 6,305,221 B1 | 10/2001 | Hutchings | |
| 6,339,746 B1 | 1/2002 | Sugiyama et al. | |
| 6,359,837 B1 | 3/2002 | Tsukamoto | |
| 6,366,855 B1 | 4/2002 | Reilly et al. | |
| 6,426,719 B1 | 7/2002 | Nagareda et al. | |
| 6,446,005 B1 | 9/2002 | Bingeman et al. | |
| 6,463,385 B1 * | 10/2002 | Fry | 701/213 |
| 6,466,232 B1 | 10/2002 | Newell et al. | |

(Continued)

FOREIGN PATENT DOCUMENTS

JP 2001 272247 A * 10/2001

OTHER PUBLICATIONS

U.S. Appl. No. 10/462,968; Personal Training Device Using GPS Data; Olivier, Tracy et al.; filed Jun. 17, 2003, US Patent 6837827.

(Continued)

Primary Examiner—Gregory C. Issing
(74) Attorney, Agent, or Firm—David L. Terrell

(57) ABSTRACT

An electronic device (10) comprising a location determining component (12), such as a global positioning system ("GPS") device, a pedometer (14), and a computing device (16) is operable to determine a distance traveled by a user. The pedometer (14) is operable to sense a step taken by the user, and the location determining component (12), when accessible, is operable to determine a distance between two positions and supply such information to the computing device (16) for continuous calculation of an accurate step size of the user. When the location determining component (12) is inaccessible, the computing device (16) determines the distance traveled using the accurate step size information. In additional embodiments, a housing (132) is provided for storing a location determining component (112), a pedometer (114), and a computing device (116), and an accelerometer (242) is provided for also determining the step size of the user. A computing device (216) is then operable to calibrate the step size of the user as determined by the accelerometer (242).

28 Claims, 7 Drawing Sheets

U.S. PATENT DOCUMENTS

| | | |
|---|---|---|
| 6,498,994 B1 | 12/2002 | Vock et al. |
| 6,510,379 B1 | 1/2003 | Hasegawa et al. |
| 6,513,046 B1 | 1/2003 | Abbott, III et al. |
| 6,513,532 B1 | 2/2003 | Mault et al. |
| 6,539,336 B1 | 3/2003 | Vock et al. |
| 6,546,336 B1 * | 4/2003 | Matsuoka et al. .......... 701/213 |
| 6,549,845 B1 | 4/2003 | Eackle, Jr. et al. |
| 6,549,915 B1 | 4/2003 | Abbott, III et al. |
| 6,570,532 B1 | 5/2003 | Mise et al. |
| 6,571,200 B1 | 5/2003 | Mault |
| 6,582,342 B1 | 6/2003 | Kaufman |
| 6,594,617 B1 | 7/2003 | Scherzinger |
| 6,621,423 B1 | 9/2003 | Cooper et al. |
| 6,826,477 B1 * | 11/2004 | Ladetto et al. .............. 701/217 |

OTHER PUBLICATIONS

U.S. Appl. No. 10/319,208; Portable Apparatus With Performance Monitoring and Audio Entertainment Features; Burrell, Jonathan; filed Dec. 13, 2000, US Patent 6853955.

* cited by examiner

ELECTRONIC EXERCISE MONITOR AND METHOD USING A LOCATION DETERMINING COMPONENT AND A PEDOMETER

BACKGROUND OF THE INVENTION

1. Field of the Invention

The present invention relates to exercise monitors and other devices operable to determine a distance traveled by a user. More particularly, the invention relates to an electronic distance-measuring device for use during exercising, walking, running, etc. and operable to determine a distance traveled by the user. The electronic device includes a location determining component, such as a global positioning system ("GPS") device, a pedometer, and a computing device operable to accurately determine the distance traveled, even if the user's step size changes during an exercise session due to changes in speed, altitude, etc.

2. Description of the Prior Art

Pedometers have long been used by fitness enthusiasts to determine a distance traveled during walking, running, hiking, etc. Prior art pedometers are commonly small in size and wearable on the user's body so as to sense steps taken by the user. In particular, pedometers are operable to sense the up/down movement of the user when walking, running, etc., such that each sensed movement corresponds to a step traveled. The distance traveled is then calculated by multiplying the number of steps traveled by an estimated step size of the user. Therefore, the distance traveled is significantly dependent on the user's step size or stride length.

To account for the user's step size, prior art pedometers provide several options for initially calibrating the pedometer. One such option requires the user to input the user's height. A data table providing average step size for a plurality of height ranges is then accessed to determine the average step size for users having the user's height. As can be appreciated, the data tables only reflect the average step size and offer no step size measurements individualized for the particular user.

A second initial calibration option requires the user to travel a known distance and count the number of steps to cover such distance. The user then inputs the number of steps into the pedometer and the pedometer uses a basic mathematical algorithm to determine the user's step size. The user must first, however, correctly measure the known distance, and second, the user must cover the distance at the general pace or speed the user will be traveling when using the pedometer.

A third option requires the user to set up a puddle of water, begin traveling well before reaching the puddle of water, such that when the user reaches the puddle of water, the user is traveling at his/her preferred speed, step into the puddle so as to wet the user's feet, step out of the puddle onto dry concrete or other surface that allows the user's footprints to be viewed, and measure the wet footprints from toe to heel to determine the user's step size.

Unfortunately, even if the user correctly initially calibrates the pedometer, pedometers are limited in determining the distance traveled if the step size of the user changes during the measurement period or if the pedometer senses extraneous movement of the user that does not actually correspond to a moved step of the user. Because the pedometer calculates the distance traveled by multiplying the number of steps taken by the step size, variations in the user's step size greatly affect the measured distance traveled. Over time, these errors can accumulate to incorrectly affect the measured distance traveled by as much as 10–20%, especially if the user changes his or her step size due to changes in a moving pace from walking, running, or sprinting. Additionally, the user may change his or her step size when changing altitudes, such as during hiking uphill/downhill.

To compensate for the disadvantages of prior art pedometers, electronic distance measuring devices have been configured that include both the pedometer and an accelerometer. An accelerometer senses an acceleration force of the user resulting from the user's impact with the ground due to walking, running, hiking, etc. The acceleration force may be detected by numerous means, including detection of a change in the electrical resistance of a flexure or measurement of a displacement of a silicon mass. The acceleration force of the user is translated into a step size of the user, which is then used to determine the distance traveled.

Although accelerometers provide a mechanism for determining the user's step size, accelerometer measurements are not always accurate or consistent. The accelerometers may still sense other movement of the user not associated with actual traveled steps, such as if the user sits down in a chair or switches body weight while standing. Additionally, the accelerometer provides no initial calibration of the pedometer, thus still requiring the user to initially calibrate the pedometer so as to have a general "zeroing" or base value for the user's step size.

Even with the disadvantages of both pedometers and accelerometers, they have been used in location determining systems to provide dead reckoning functions. The location determining systems commonly use a global positioning system ("GPS") receiver to determine or calculate a location or a position of a user. However, the GPS receiver is not always operable when GPS satellite signals are blocked by heavily wooded areas, tall buildings, tunnels, etc. The location determining systems compensate for the inaccessibility of GPS satellite signals by providing the pedometer and/or accelerometer, which are operable to determine the distance traveled from a previously known location. However, as discussed above, the pedometer and/or accelerometer are not consistently accurate, thus causing error to accumulate when the pedometer and/or accelerometer are the sole location determining components of the location determining system. Therefore, when GPS satellite signals are again accessible, the GPS receiver corrects the accumulated error of the pedometer and/or accelerometer.

Prior art location determining systems comprising the GPS receiver and the pedometer and/or accelerometer are not configured to calculate a distance traveled but rather are configured to determine the location or position of the user. As such, the systems provide no method or mechanism for calibrating the pedometer so that the pedometer may calculate a more accurate distance traveled. Instead, the systems merely correct accumulated position error once GPS satellite signals are accessible, which does not allow the pedometer to accurately determine the distance traveled at future times when GPS satellite signals are again inaccessible.

Accordingly, there is a need for an improved distance-measuring device that overcomes the limitations of the prior art. More particularly, there is a need for a device that will accurately determine a distance traveled, even when a location determining component of the device is inaccessible. Additionally, there is a need for a device that does not require initial calibration of the user's step size. Further, there is a need for a device that can learn the user's step size for varying speeds based upon past use by the user, such that the device is operable to determine the distance traveled, irrespective of whether the location determining component is accessible.

SUMMARY OF THE INVENTION

The present invention solves the above-described problems and provides a distinct advance in the art of distance-measuring devices. More particularly, in a first preferred embodiment, the present invention provides an electronic device operable to accurately determine a distance traveled by a user who is walking, running, hiking, etc. The electronic device comprises a location determining component, a pedometer, and a computing device. The computing device may be a processor or controller of the location determining component or pedometer or, alternatively, may be a separate device.

The pedometer is operable to sense a plurality of steps taken by the user, and the computing device is operable, from the sensed steps, to determine the distance traveled by multiplying the number of sensed steps by a step size of the user. However, because the step size of the user is different for each user and may even change while the user is traveling due to changes in speed or altitude, the step size of the user must be continuously calculated by the computing device so as to determine the distance traveled with the most recent and accurate step size of the user.

The electronic device continuously calculates the step size of the user with the assistance of the location determining component and the computing device by performing an iterative calibration process broadly comprising the steps of (a) selecting two positions separated by a predetermined value; (b) sensing a number of steps taken between the two positions with the pedometer; (c) determining a distance between the selected two positions with the location determining component; and (d) calculating, with the computing device, the step size of the user by dividing the distance between the two selected positions by the sensed number of steps taken between the two positions. The predetermined value separating the two positions may be either a distance separating the positions or a time for traveling between the two positions. For example, the two positions may be separated by a distance of 100 feet, or alternatively, the two positions may be separated based on a set time, such that the positions are based on beginning and ending locations every 30 seconds. The pedometer is operable to sense the number of steps traveled between the two positions. The location determining component then determines the distance between the two positions, which, of course, may be the same predetermined distance value. The computing device calculates the step size of the user by dividing the distance separating the two positions by the number of steps required to travel such distance.

Because the process is iterative, i.e., it is performed continuously, while the location determining component is operable, the computing device continuously calculates new step size information. Therefore, when the location determining component is inoperable, the computing device is operable to use the most recent step size information to determine the distance traveled.

An alternative feature of the electronic device provides for adaptive learning of the user's step size over an extended use time. After a sufficient number of uses, the computing device is operable to associate travel at a known speed for a specific user with a measured time between sensed steps. Thereafter, when the pedometer senses steps that are separated by substantially approximately the same time as the previously measured, sensed steps, the computing device knows that the user is traveling at substantially approximately the same previously known speed. From a known traveling speed, the computing device is operable to determine the distance traveled. The adaptive learning method thus allows the electronic device to accurately determine the distance traveled, even when the location determining component is inaccessible for long periods of time.

A second preferred embodiment of the present invention is substantially similar to the first preferred embodiment, except that an electronic device is stored in a portable housing for removably wearing on a user's forearm, wrist, or other body part.

A third preferred embodiment is substantially similar to the first preferred embodiment and further includes an accelerometer for determining the step size of the user. The accelerometer may be calibrated by a location determining component so as to obtain accurate step size measurements when the location determining component is inaccessible or inoperable. The accelerometer is calibrated using a computing device by comparing the step size of the user as determined by the accelerometer to the step size of the user as determined by the location determining component. Any difference in the measured step sizes is considered error and a correction factor is obtained. The correction factor is then applied by the computing device when calculating the distance traveled.

A fourth preferred embodiment is substantially similar to the third preferred embodiment, except that an electronic device comprising a location determining component, a pedometer, an accelerometer, and a computing device is stored in a housing substantially similar to the housing of the second preferred embodiment.

A fifth preferred embodiment is substantially similar to the fourth preferred embodiment and further includes a heart rate monitor for determining a heart rate of the user and a temperature sensor for determining a body temperature of the user.

By constructing an electronic distance-measuring device as described herein, numerous advantages are realized. For example, the electronic device is operable to determine a distance traveled by a user, even when a location determining component of the device is inaccessible or inoperable. As such, a step size of the user is continuously calculated so as to determine the distance traveled with the most recent step size information.

Additionally, because the location determining component and computing device are used in conjunction with the pedometer, the pedometer need not be initially calibrated with the user's step size. This greatly facilitates the user's first use of the electronic distance-measuring device and precludes the user from having to perform complicated, time-consuming initial calibration steps.

Further, the present invention provides an additional calibration method that may be performed to accurately obtain the distance traveled, even when the location determining component is inaccessible for long periods of time.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein.

Figure 1:
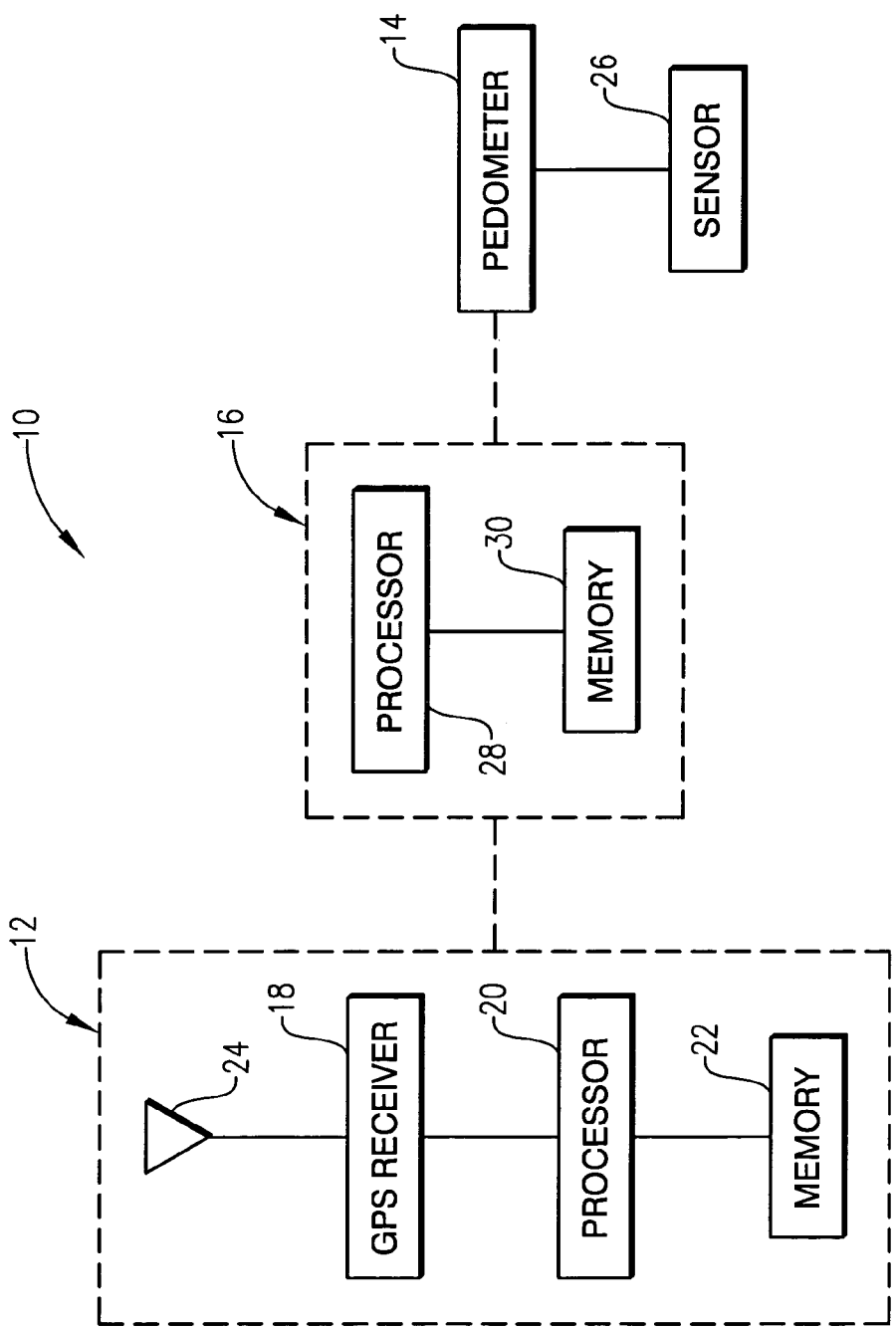
FIG. 1 is a block diagram of an electronic device constructed in accordance with a first preferred embodiment of the present invention and particularly illustrating a location navigation component, a pedometer, and a computing device.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

Figure 2:
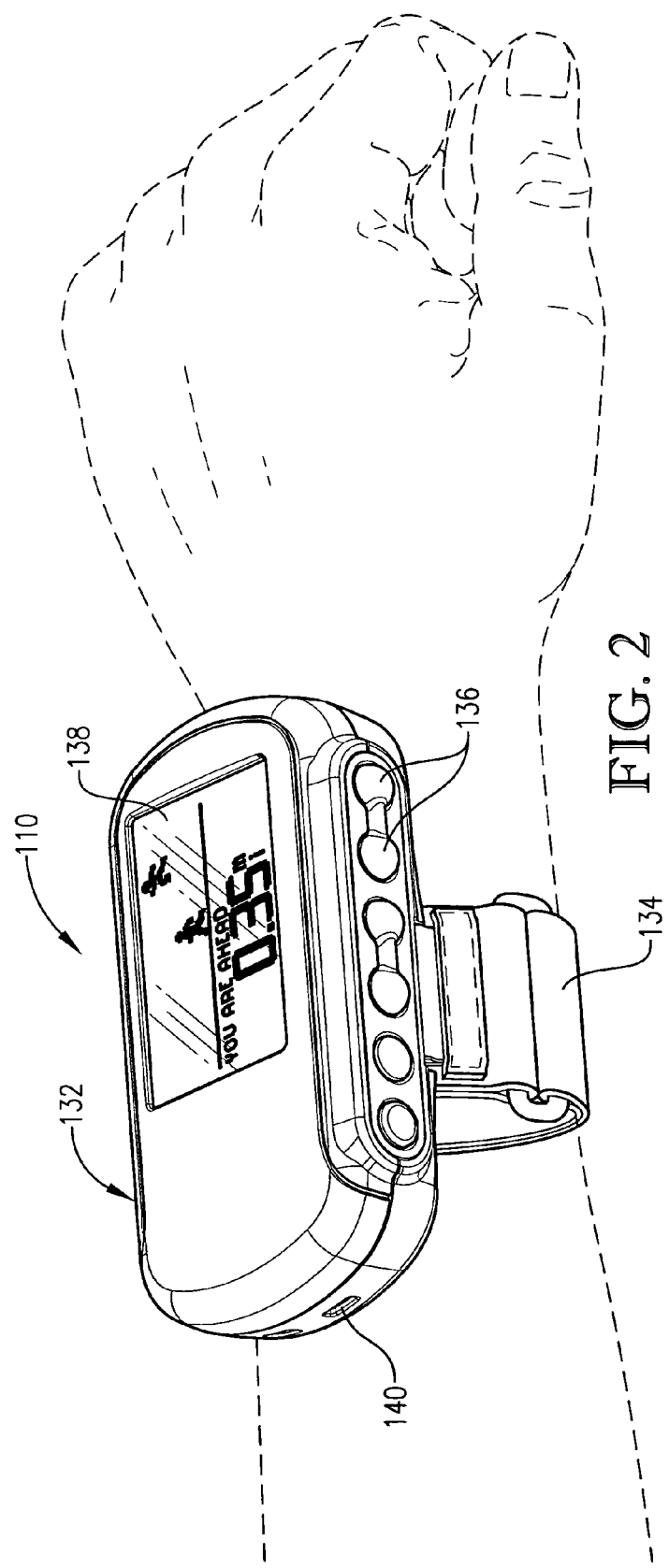
FIG. 2 is an isometric view of the electronic device stored in a wearable housing constructed in accordance with a second preferred embodiment of the present invention and being shown worn on a user's forearm.

Turning now to the drawing figures, and particularly FIGS. 1 and 2, an electronic device 10 for measuring a distance traveled by a user is shown constructed in accordance with a first preferred embodiment of the invention. The electronic device 10 of the first preferred embodiment broadly comprises a location determining component 12, a pedometer 14, and a computing device 16 that are in communication with each other by any suitable means, such as radio frequency, infrared, hardwired electrical communication, or wireless technology sold under the trademark BLUETOOTH. The electronic device 10 is operable to accurately measure a distance traveled by sensing, via the pedometer 14, a plurality of steps taken by the user and calculating, via the location determining component 12 and the computing device 16, the user's step size. The electronic device 10 may determine the distance traveled even when the location determining component 12 is inaccessible or inoperable. As such, the electronic device 10 provides continual and accurate measurements of the distance traveled, without requiring the user to initially calibrate the pedometer 14 or manually input a step size of the user.

Referring to FIG. 1, the location determining component 12 is preferably a global positioning system ("GPS") device having a GPS receiver 18, a processor 20, a memory 22, and an antenna 24. Together, these components are adapted to provide, in a substantially conventional manner, geographic location information for the electronic device 10 based on signals received from an array of orbiting satellites. In particular, the GPS receiver 18 is operable to receive satellite signals via the antenna 24 from a plurality of satellites. The processor 20 is coupled with the GPS receiver 18 and is operable to calculate a location of the location determining component 12 as a function of the satellite signals. The memory 22 is also coupled with the processor 20 and is operable to store position information, including a distance between two positions, as discussed below. The location determining component 12 may be, for example, a GPS device similar to products provided by Garmin Corporation and disclosed in U.S. Pat. No. 6,434,485, herein incorporated by reference.

The pedometer 14 is any standard, conventional pedometer that is relatively small in size and is operable to be worn on a user's body or clothing. The pedometer 14 is preferably operable to sense the up/down motion of the user while walking, running, sprinting, etc. The pedometer 14 is operable to sense such motion of the user by employing a spring-loaded mechanical pendulum or other sensor 26 operable to detect the user's movement. The pendulum reacts to the up/down motion, such that each movement of the pendulum is counted as a step taken by the user. The sensed steps are then transmitted to the computing device 16 for determining the distance traveled by multiplying the number of steps taken by the user, as determined by the pedometer 14, by the step size of the user, as described in more detail below. The step size of the user is the user's stride length, which is commonly measured as a distance from the toes of the user's left foot to the heel of the user's right foot.

The computing device 16 is preferably a separate, stand-alone device from the location determining component 12 and pedometer 14 and comprises a processor 28 and a memory 30, as illustrated in FIG. 1. The processor 28 is operable to receive the number of sensed steps from the pedometer 14, receive distance separation information from the location determining component 12, and calculate an accurate step size of the user, as described in more detail below. The processor 28 is then operable to calculate the distance traveled, as also described in more detail below, by multiplying the accurate step size of the user by the number of sensed steps as determined by the pedometer 14. Computed step size information and distance traveled information may then be stored on the memory 30.

Alternatively, the computing device 16 may comprise a processor (not shown) or a controller (not shown) resident in or part of the location determining component 12, such that the computing device 16 is the processor 20 of the location determining component 12. An even further alternative provides that the computing device 16 is a processor (not shown) of the pedometer 14 or is resident in or part of the pedometer 14.

The step size of the user greatly affects the measured distance traveled by the user. Therefore, to accurately determine the distance traveled when the location determining component 12 is inaccessible, the present invention uses the computing device 16 to determine the step size of the user so as to insure that the most accurate step size is being used to determine the distance traveled. The present invention, in contrast to prior art pedometers, does not require the user to initially calibrate the pedometer 14 by manually inputting his or her step size. Additionally, the present invention is operable to compensate for varying step sizes of the user, due to changes in speed or altitude, by continuously calculating the most recent step size data. As such, the computing device 16 is operable to continuously provide the most accurate distance traveled throughout the user's traveling session.

To continuously calculate the new step size data, the electronic device 10 of the present invention performs an iterative calibration process broadly comprising the steps of (a) selecting two positions separated by a predetermined value; (b) sensing a number of steps taken between the two positions with the pedometer 14; (c) determining a distance between the selected two positions with the location determining component 12; and (d) calculating the step size of the user, with the computing device 16, by dividing the distance between the two selected positions by the sensed number of steps taken between the two positions. When the location determining component 12 is inaccessible or inoperable, the electronic device 10 is still operable to accurately determine the distance traveled by the user by multiplying the calculated step size by the sensed number of steps. Because the above-described process is iterative, i.e., it is performed continuously, the electronic device 10 of the present invention may apply the most recent step size of the user in determining the distance traveled when the location determining component 12 is inaccessible.

The predetermined value separating the two positions selected for determining the step size may either be a distance separating the positions or a time for traveling between the two positions. The distance separating the positions may be, for example, 100 feet, such that for every 100 feet traveled by the user as determined by the location determining component 12, the number of steps necessary for traveling the 100 feet is sensed by the pedometer 14. Because the calibration process of the electronic device 10 is iterative, for every 100 feet traveled, the calibration process is performed. Longer or shorter distances for each calibration session may be used, depending on a process speed of the computing device 16, a percentage error for accuracy desired, etc. For a first calibration process in a session, the user may need to walk, run, or otherwise travel the predetermined, prescribed distance before the electronic device 10 performs the first calibration process. After the first calibration process is performed, no further initial calibration by the user is required.

Similarly, the electronic device 10 may perform the calibration process based on a time since the last calibration process was performed or based on a start time for the first calibration process. For example, the calibration process may be performed every 30 seconds, such that the distance traveled during the last 30 seconds and the number of steps sensed during the last 30 seconds are used to calculate the step size of the user. If the calibration process is the first such process for a traveling session, then the user may be required to walk, run, or otherwise travel for the prescribed time before the pedometer is calibrated.

As the user travels the predetermined distance or time, the pedometer 14 senses the number of steps taken and transmits such information to the computing device 16. The location determining component 12 then determines the distance separating the two selected positions and also transmits such information to the computing device 16. It may be that the distance separating the two positions is already known, especially if the predetermined value separating the positions is a prescribed distance, as described above. Otherwise, the distance separating the two positions, hereinafter referred to as the distance separation information, is determined using the location determining component 12, as is known in the art. The accurate step size of the user is then calculated with the computing device 16 by dividing the distance separating the two positions by the number of steps required to travel such distance.

Because the step size of the user may change often, especially if hiking on uneven terrain, increasing/decreasing altitude, or changing a traveling speed, the above-described calibration process is performed continuously. This allows the most accurate step size data to be used by the computing device 16 in determining the distance traveled. This is especially important when, as discussed above, the location determining component 12 is inaccessible or inoperable. In addition to continuously calculating the changing step size of the user with the computing device 16, the pedometer 14 need not be manually, initially calibrated by the user. Therefore, the user need not enter height, measured step size, etc.

The electronic device 10 is also operable to perform adaptive learning of the user's step size when traveling at various speeds. After a sufficient number of uses, the computing device 16 is operable to associate travel at a known speed for a specific user with a measured time between sensed steps. Thereafter, whenever the pedometer 14 senses steps that are separated by substantially approximately the same time as the previously measured, sensed steps and transmits such to the computing device 16, the computing device 16 knows that the user is traveling at substantially approximately the same previously known speed.

For example, in addition to determining the distance traveled as described above, the computing device 16 of the electronic device 10 is also operable to determine an average speed. The distance traveled and average speed can be broken into a plurality of segments, with each segment corresponding to one calibration process. For each segment, the computing device is operable to determine a traveling speed for the segment and, as described above, the distance traveled for the segment. The computing device 16 may use this known information, which it stores in the memory 30, to learn the speed that corresponds to the number of sensed steps. For example, if during the segment the computing device 16 measures the user's speed at 6 miles per hour, and also records that a time between sensed steps of the user is approximately 0.12 seconds, then the computing device 16 learns that for any future session where the user is moving such that the time between sensed steps is approximately 0.12 seconds, the user is traveling at approximately 6 miles per hour. Based on the speed of travel, the computing device 16 may then calculate the distance traveled by multiplying the speed of travel by the time traveled. Preferably, the computing device 16 is operable to continuously monitor the time between sensed steps to further account for any changes in traveling speed.

The above-described adaptive learning of the electronic device 10 allows for a second method of determining the distance traveled when the location determining component 12 is inaccessible or inoperable. Unlike the above method, however, the adaptative learning method may be used when the location determining component 12 is inaccessible for long periods of time, as the adaptive learning method relies on past known speed and distance values for the user, as opposed to recent step size data.

As can be appreciated, the adaptive learning for the electronic device 10 is specific to the user. It may be that the time separating sensed steps for one user corresponds to a different speed that the same time between sensed steps for a second user. Therefore, the electronic device 10 is preferably operable to receive input identifying the user. For example, the electronic device 10 may instruct the user to identify himself or herself by name or other identifying characteristic at the beginning of each session. The electronic device 10 will then correlate the user's time between steps with previously known values for the particular user to determine the distance traveled.

Figure 3:
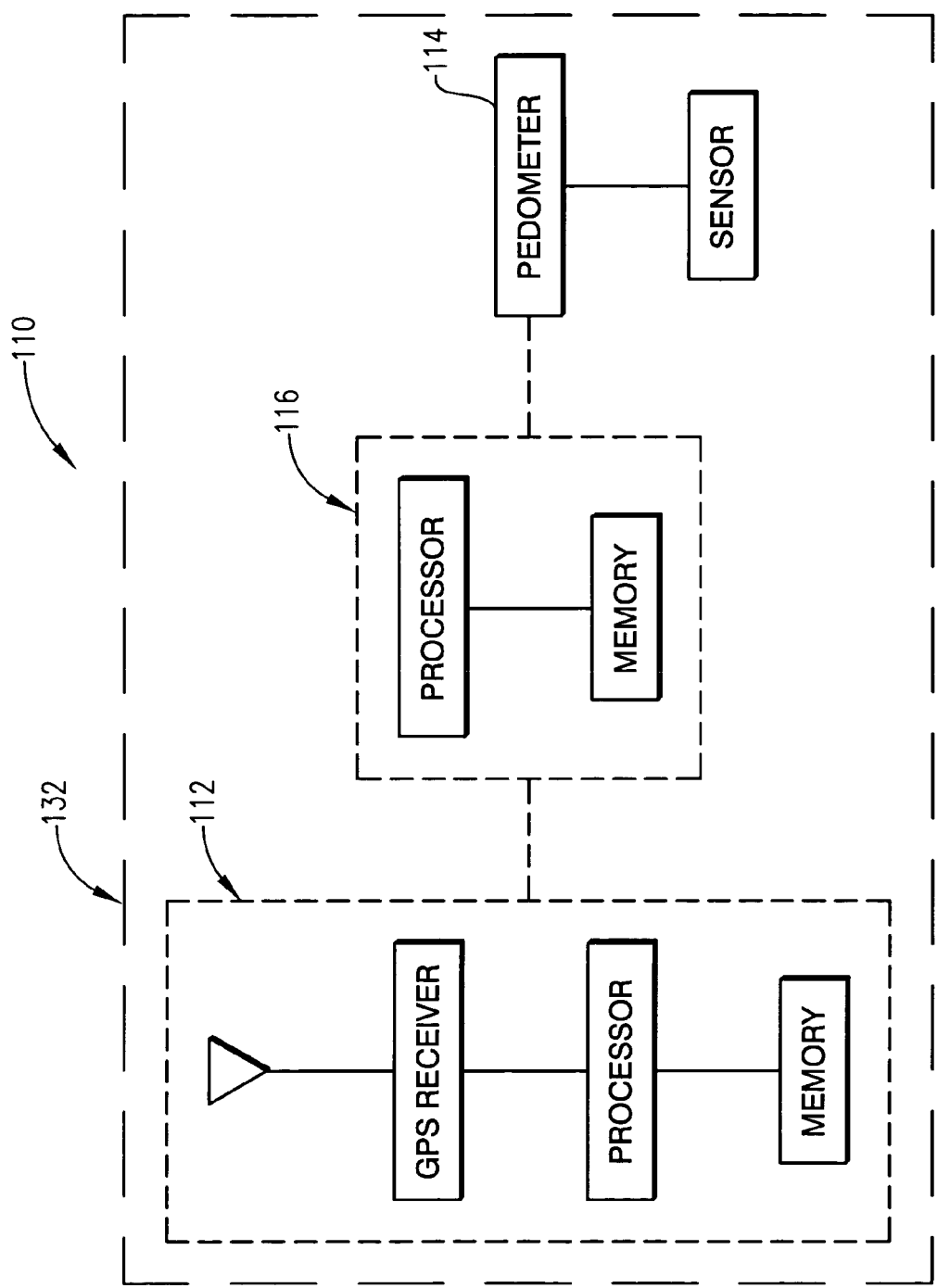
FIG. 3 is a block diagram of the electronic device of the second preferred embodiment and particularly illustrating a location navigation component, a pedometer, and a computing device stored within the housing.
Figure 4:
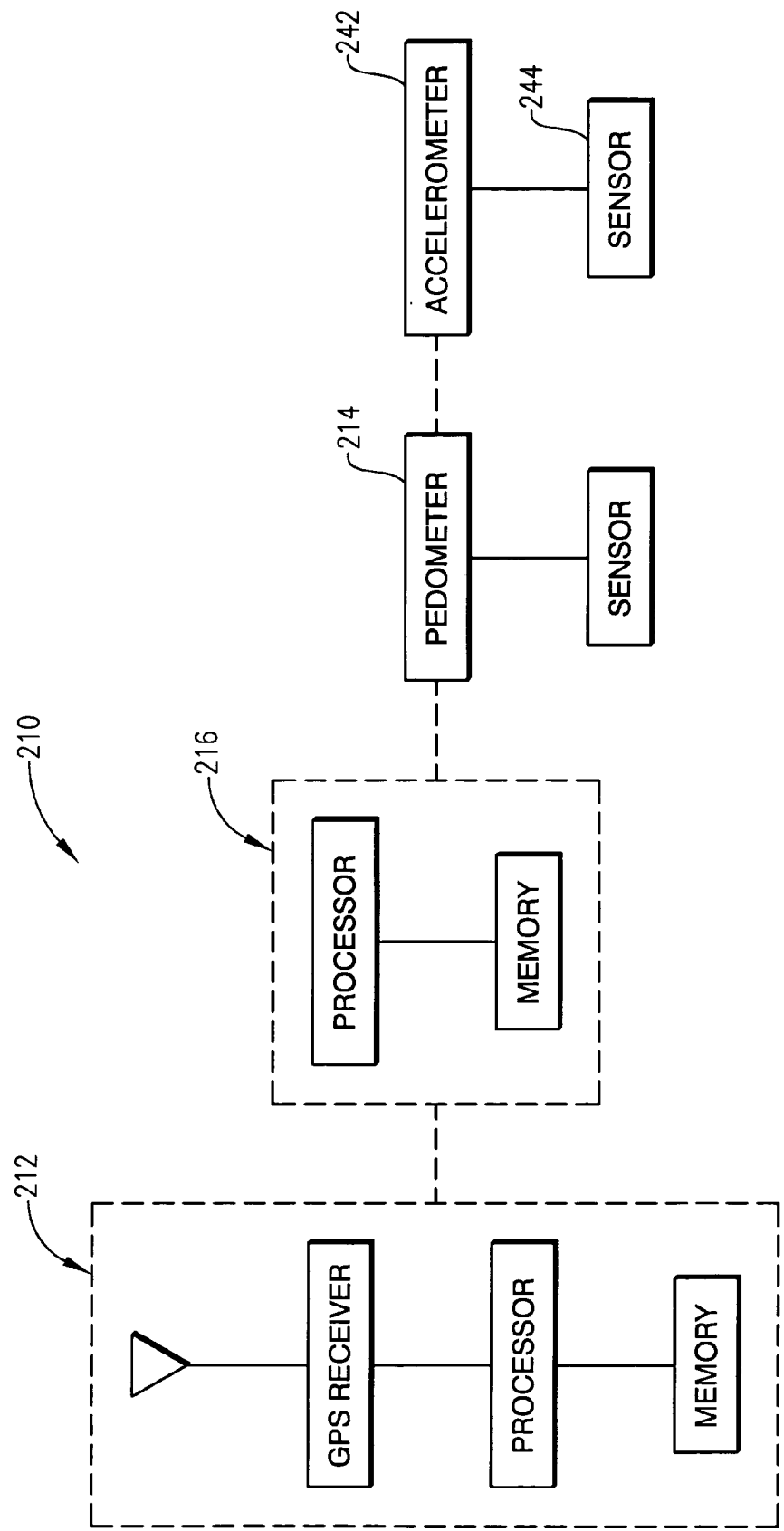
FIG. 4 is a block diagram of an electronic device constructed in accordance with a third preferred embodiment and particularly illustrating a location navigation component, a pedometer, an accelerometer, and a computing device.

As illustrated in FIGS. 2 and 3, a second preferred embodiment is substantially similar to the first preferred embodiment, except that it includes a housing 132 for storing an electronic device 110, having a location determining component 112 comprising a GPS receiver 118, a processor 120, a memory 122, and an antenna 124; a pedometer 114 comprising a sensor 126; and a computing device 116 comprising a processor 128 and a memory 130.

The housing 132 is configured for easy use and operation of the electronic device 110 by the user while engaging in physical activities that normally prohibit or make difficult the operation of electronic devices. For example, the housing 132 is configured to allow the device to be operated by the user while exercising, running, jogging, playing, hiking, or otherwise moving, on defined or undefined courses or terrain, for land-based activities or water-based activities, or for any combination thereof. The housing 132 is substantially similar to the housing disclosed in U.S. application Ser. No. 10/786,377 (the '377 application) entitled WEARABLE ELECTRONIC DEVICE, filed Feb. 25, 2004, and herein incorporated by reference. In particular, the housing 132 is preferably configured to protect the location determining component 112, pedometer 114, and computing device 116 stored within against adverse conditions, such as moisture, vibration, and impact associated with the exercise or movement of the user. As in the '377 application, the housing 132 may be removably secured to the user's forearm, wrist, or other body part via a strap 134 to facilitate operation of the electronic device 110 during exercise or other periods of activity. Although the housing described in the '377 application is preferable, other suitable housings may be used to store the location determining component 112, pedometer 114, and computing device 116, including any portable, handheld housing.

As illustrated in FIG. 2, the housing 132 preferably includes a plurality of inputs 136, a display 138, and a contact 140, substantially similar to the inputs, display, and contact of the '377 application. The inputs 136 allow for operation of the electronic device 110 and management of the associated features of the electronic device 110, such as displaying an elapsed travel time, the travel speed, the distance traveled, the identified user, etc. Such information may be displayed on the display 138, as described in the '377 application.

The contact 140 is operable to interface the electronic device with external devices, such as a power adapter for recharging a power source or a data source, such as a hub, computer, network, or other information or data device. The contact 140 is substantially similar to the contact described in the '377 application.

An electronic device 210 of a third preferred embodiment of the present invention is substantially similar to the first preferred embodiment, and includes a location determining component 212 comprising a GPS receiver 218, a processor 220, a memory 222, and an antenna 224; a pedometer 214 comprising a sensor 226; and a computing device 216 comprising a processor 228 and a memory 230. The electronic device 210 of the third preferred embodiment further comprises an accelerometer 242.

As is well known in the art, the accelerometer 242 measures the step size of the user by sensing the harmonic motions and impact accelerations of the user resulting from walking, running, sprinting, etc. When combined with the pedometer 214, the accelerometer 242 is operable to provide information about the user's step size so as to determine the distance traveled. The accelerometer 242 may then be calibrated, with the assistance of the location determining component 212 and the computing device 216, so as to obtain accurate step size measurements of the user when the location determining component 212 is inaccessible.

Figure 5:
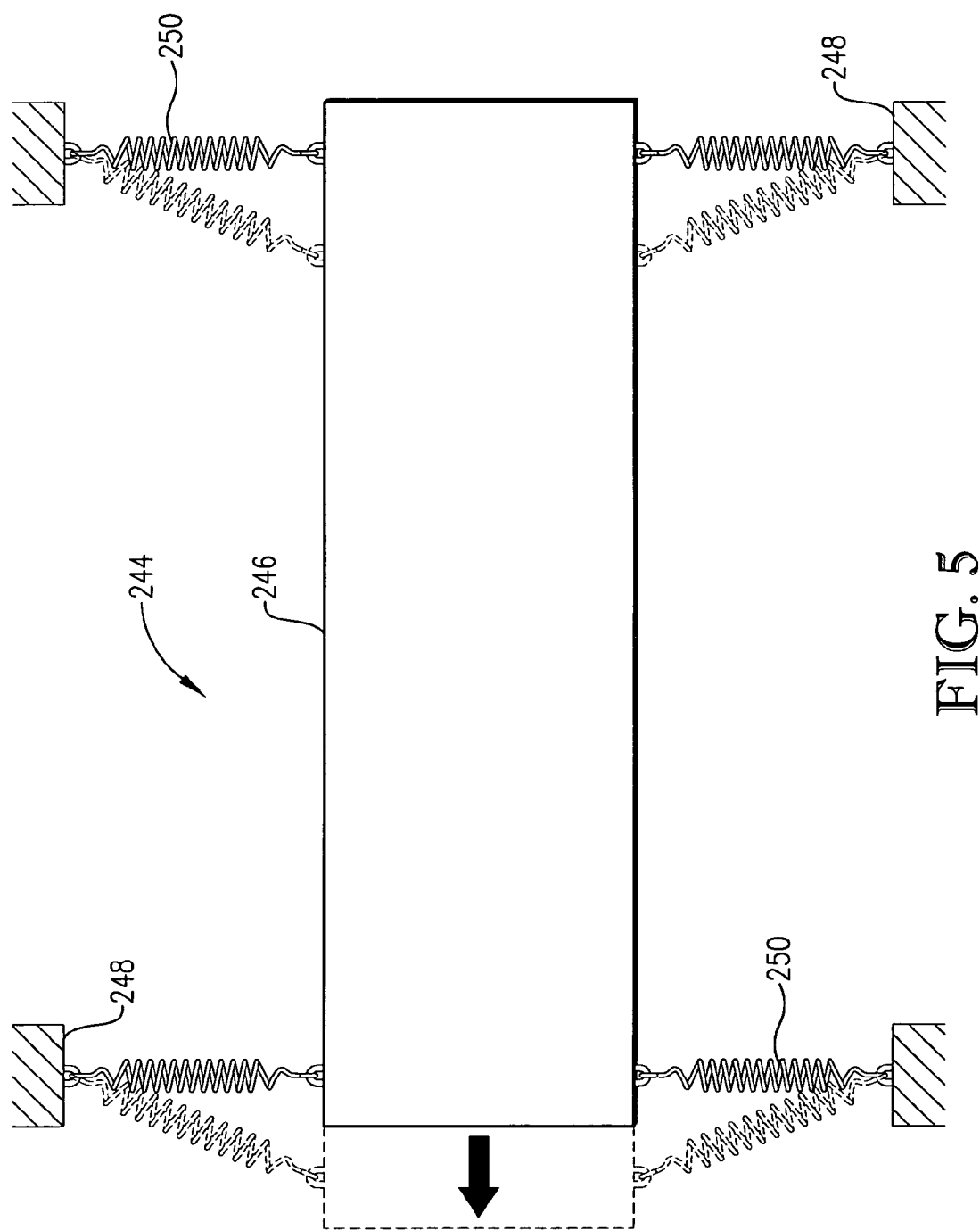
FIG. 5 is a side elevational view of a tethered sensor of the accelerometer and particularly illustrating in broken line the sensor displaced a certain distance.
Figure 6:
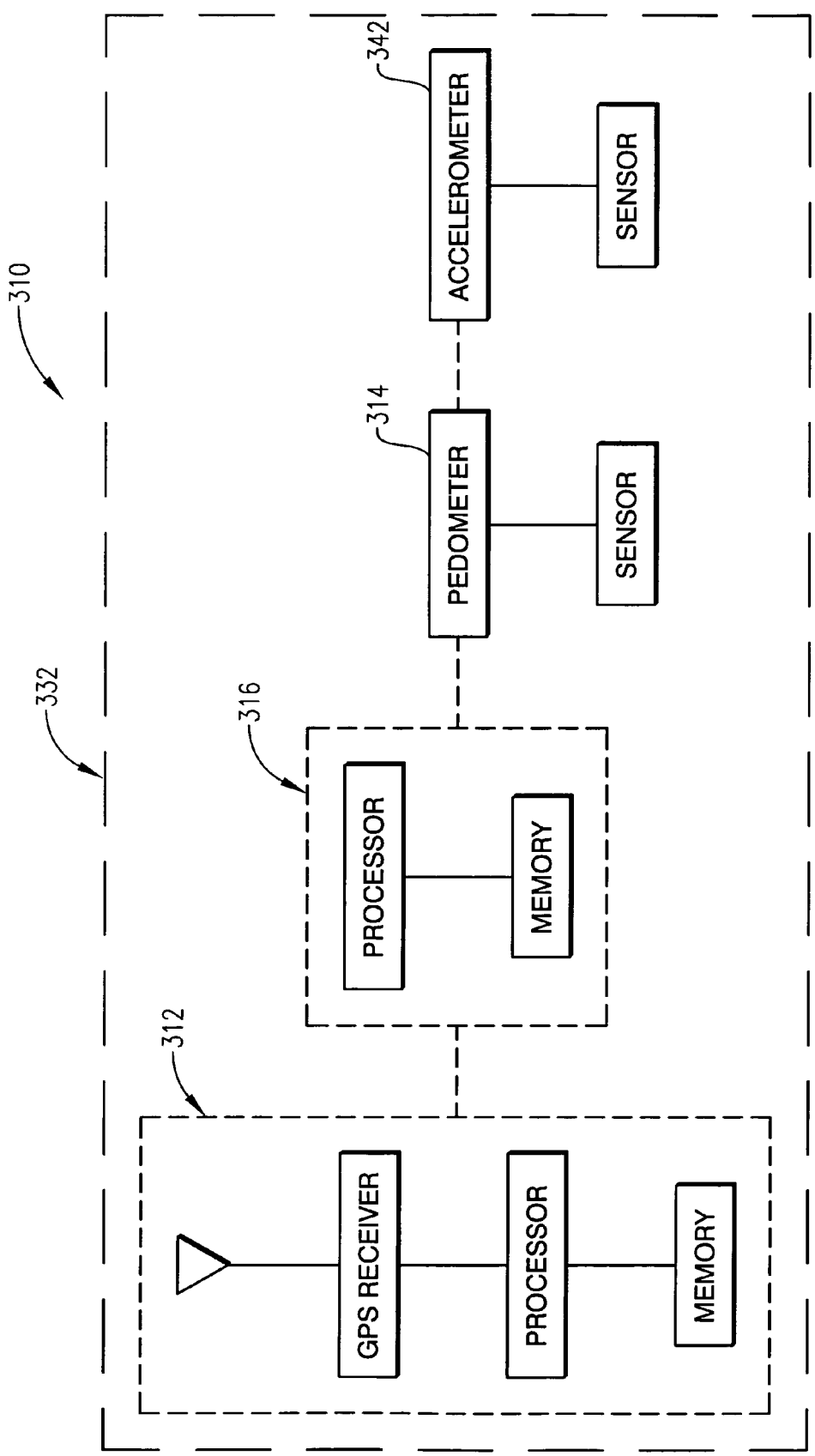
FIG. 6 is a block diagram of an electronic device constructed in accordance with a fourth preferred embodiment and particularly illustrating the electronic device stored in a housing.
Figure 7:
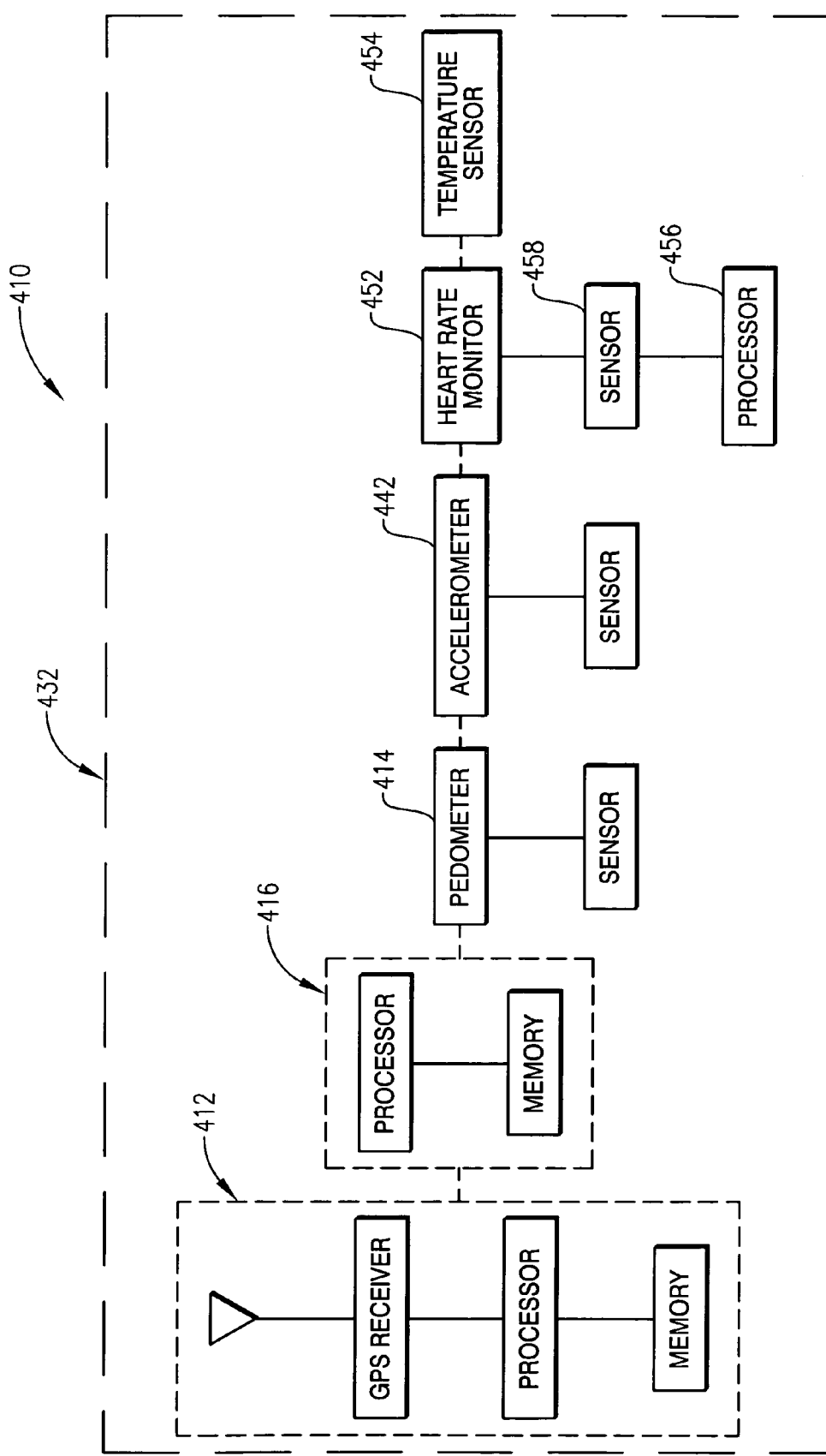
FIG. 7 is a block diagram of an electronic device constructed in accordance with a fifth preferred embodiment and particularly illustrating a heart rate monitor and a temperature sensor.

Accelerometers greatly differ on a type of sensor used to sense the impact accelerations of the user. For the present invention, the accelerometer includes a sensor 244 that is preferably a spring-loaded, micro-machined system comprising a mass 246 tethered to at least one block 248 via a plurality of springs 250 positioned proximate to each corner of the mass 246, as illustrated in FIG. 5. However, any suitable sensor 244 for sensing impact accelerations may be used. The accelerometer's mass 246 is preferably comprised of silicon. The mass 246 responds to accelerations that occur along the length of the mass 246. When an acceleration occurs, the mass 246 moves with respect to the ends of the springs 250 anchored at the block 248. Therefore, the amount of acceleration is generally approximately proportional to the amount of displacement of the mass 246. Because the spring-loaded sensor 244 of the accelerometer 242 is not an ideal spring, i.e., the spring does not react exactly according to Hook's Law, the sensor 244 must compensate for slight deviations in displacement of the mass 246 using electronic circuitry (not shown), as is well known in the art. The step size of the user is then determined by the displacement of the mass 246, which is determined in a conventionally known manner, such as using one or more capacitors (not shown) to measure the displaced distance.

As can be appreciated, any accelerometer 242 operable to determine the step size of the user is suitable for the present invention. Therefore, the above description of the preferable accelerometer should not be construed as limiting.

As noted above, when the location determining component 212 is inaccessible, and thus, the user's step size cannot be determined using information provided by the location determining component 212, the accelerometer 242 may be used to determine the user's step size. Note that the computing device 216 determines the step size of the user when the location determining component 212 is accessible using the same iterative calibration process as described in the first preferred embodiment. When using the accelerometer 242 to determine the step size of the user, the computing device 216 multiplies the number of steps sensed by the pedometer 214 by the step size sensed by the accelerometer 242 to obtain the distance traveled. However, because the accelerometer 242 does include a small percentage of error, calibration of the accelerometer 242 is desired to continually obtain accurate measurements. Therefore, when the location determining component 212 is accessible, the computing device 216 calibrates the step size as determined by the accelerometer 242 by comparing the step size measured by the computing device 216 with the assistance of the location determining component 212 to the step size measured by the accelerometer 242. Any amount by which the step size as measured by the accelerometer 242 differs as compared to the step size as measured by the computing device 216 is considered error. A correction factor compensating for the detected error can then be applied to the distance traveled. Therefore, even when the location determining component 212 is inaccessible, the computing device 216 is still operable to accurately determine the distance traveled by using the step size as determined by the accelerometer 242. As with calculating the distance traveled in the first preferred embodiment, the third preferred embodiment preferably continuously calculates the distance traveled using the most accurate step size as determined by the accelerometer 242 every predetermined set distance or time when the location determining component 212 is accessible.

The accelerometer 242 can be used independently of the adaptive learning process described in the first preferred embodiment or in conjunction with such process to gain an even more accurate value for the distance traveled. For example, a certain time between steps, as sensed by the pedometer 214, can be correlated with a certain impact acceleration, as sensed by the accelerometer 242. The sensed impact acceleration is then correlated with a certain speed of travel using the computing device 216. By accessing known, stored values, the computing device 216 can learn that when the pedometer 214 measures steps separated by the certain time, such steps correspond to the predetermined, known speed. This allows the computing device 216 to accurately determine the distance traveled, even when the location determining component 212 is inaccessible.

An electronic device 310 of a fourth preferred embodiment of the present invention is substantially similar to the electronic device 210 of the third preferred embodiment and includes a location determining component 312 comprising a GPS receiver 318, a processor 320, a memory 322, and an antenna 324; a pedometer 314 comprising a sensor 326; a computing device 316 comprising a processor 328 and a memory 330; an accelerometer 342 comprising a sensor 344; and further including a housing 332 substantially similar to the housing 132 described in the second preferred embodiment. The location determining component 312, the pedometer 314, the computing device 316, and the accelerometer 342 are all stored within the housing 332 wearable on the user's forearm. Similar to the second preferred embodiment, the housing 332 is substantially similar to the housing described in the '377 application and as such, is configured for wearing on the user's forearm during activities such as exercising, hiking, walking, running, etc.

Although the housing described above is preferable, as with the second preferred embodiment, the housing 332 may be any suitable portable, handheld housing that may be either worn by the user or held by the user during the above-described activities.

An electronic device 410 of a fifth preferred embodiment of the present invention is substantially similar to the electronic device 310 of the fourth preferred embodiment and includes a location determining component 412 comprising a GPS receiver 418, a processor 420, a memory 422, and an antenna 424; a pedometer 414 comprising a sensor 426; a computing device 416 comprising a processor 428 and a memory 430; an accelerometer 442 comprising a sensor 444; and further including a heart rate monitor 452 and a temperature sensor 454. The location determining component 412, the pedometer 414, the computing device 416, the accelerometer 442, the heart rate monitor 452, and the temperature sensor 454 are all stored within a housing 432 wearable on the user's forearm and substantially similar to the housing 332 described in the fourth preferred embodiment.

The heart rate monitor 452 is preferably operable to continuously determine a heart rate of the user and is operable to transmit heart rate information to the other components of the electronic device 410, such as the computing device 416. The user may then control his/her intensity of exercise by monitoring his/her heart rate. The heart rate monitor 452 preferably includes a processor 456 and a sensor 458 for sensing the heart rate of the user. The heart rate, as sensed by the sensor 458, is transmitted to the processor 456. The processor 456 may then display the heart rate on a display (not shown) of the electronic device 410. Additionally, the processor 456 is preferably operable to determine a percentage heart rate, such as a maximum heart rate, of the user and display such on the display. Preferably, the user can enter his/her age for a determination of the maximum percentage heart rate for the user, as is well known in the art. The electronic device 410 is then preferably operable to notify the user when his/her heart rate reaches the maximum heart rate or when the user's heart rate reaches a pre-instructed heart rate, as instructed by the user. To notify the user, the electronic device 410 may make a beeping sound or other notifying signal, such as flashing the heart rate on the display.

The temperature sensor 454 is operable to determine a body temperature of the user, and the electronic device 410 is preferably operable to display the sensed temperature on the display. As with the heart rate monitor 452, the user may instruct the temperature sensor 454 to notify the user when the user's temperature reaches a pre-instructed maximum level or other potentially unsafe temperature level.

Although the invention has been described with reference to the preferred embodiment illustrated in the attached drawing figures, it is noted that equivalents may be employed and substitutions made herein without departing from the scope of the invention as recited in the claims. For example, as with the location determining component 12 and pedometer 14 of the first preferred embodiment, the computing device 16 may be resident in or part of the accelerometer 242, or, alternatively, the computing device 16 may be a processor (not shown) of the accelerometer 242. If, for example, the computing device 16 is resident in the pedometer 14, the location determining component 12 may supply the distance separation information to the processor of the pedometer 14, and the processor may then continuously calculate new step size information for determining the distance traveled.

Having thus described the preferred embodiment of the invention, what is claimed as new and desired to be protected by Letters Patent includes the following:

1. An electronic device for determining a distance traveled by a user comprising:
   a pedometer operable to sense a plurality of steps taken by the user;
   a location determining component operable to determine a distance between two positions;
   a computing device for continuously calculating an accurate step size of the user by selecting two positions, sensing a number of steps taken between the two positions with the pedometer, determining a distance between the selected two positions with the location determining component, and dividing the distance between the two selected positions by the sensed number of steps taken between the two positions, such that the computing device is operable to determine the distance traveled using the accurate step size of the user when the location determining component is inoperable; and
   wherein the computing device is a stand-alone device separate from the location determining component and the pedometer, and wherein the computing device continuously calculates the step size of the user using the distance separation information supplied by the location determining component by
       selecting two positions separated by a predetermined value,
       sensing a number of steps taken between the two positions with the pedometer, determining a distance between the selected two positions with the location determining component, and dividing the distance between the two selected positions by the sensed number of steps taken between the two positions.

2. The electronic device as claimed in claim 1, wherein the location determining component is a global positioning system ("GPS") device.

3. The electronic device as claimed in claim 2, wherein the GPS device includes a GPS receiver for receiving satellite signals from a plurality of satellites, an antenna coupled with the GPS receiver for facilitating receipt of the satellite signals by the GPS receiver, a processor coupled with the GPS receiver for calculating a location of the GPS unit as a function of the satellite signals, and a memory coupled with processor and operable to store the distance between the two selected positions.

4. An electronic device for determining a distance traveled by a user comprising:

a pedometer operable to sense a step taken by the user;

an accelerometer operable to determine a step size of the user;

a location determining component for determining distance separation information;

a computing device operable to continuously calculate the step size of the user using the distance separation information supplied by the location determining component, such that when the location determining component is operable, the computing device calibrates the step size of the user as determined by the accelerometer, and when the location determining component is inoperable, the step size of the user as determined by the accelerometer and calibrated by the computing device is used to calculate the distance traveled; and wherein the computing device is a stand-alone device separate from the location determining component, the pedometer, and the accelerometer, and wherein the computing device continuously calculates the step size of the user using the distance separation information supplied by the location determining component by selecting two positions separated by a predetermined value, sensing a number of steps taken between the two positions with the pedometer, determining a distance between the selected two positions with the location determining component, and dividing the distance between the two selected positions by the sensed number of steps taken between the two positions.

5. The electronic device as claimed in claim 4, wherein the computing device continuously calculates the step size of the user using the distance separation information supplied by the location determining component by selecting two positions separated by a predetermined value, sensing a number of steps taken between the two positions with the pedometer, determining a distance between the selected two positions with the location determining component, and dividing the distance between the two selected positions by the sensed number of steps taken between the two positions.

6. The electronic device as claimed in claim 5, wherein the computing device calculates the distance traveled by multiplying the number of steps sensed by the pedometer by the step size of the user.

7. The electronic device as claimed in claim 6, wherein the location determining component is a global positioning system ("GPS") device.

8. The electronic device as claimed in claim 7, wherein the GPS device includes a GPS receiver for receiving satellite signals from a plurality of satellites, an antenna coupled with the GPS receiver for facilitating receipt of the satellite signals by the GPS receiver, a processor coupled with the GPS receiver for calculating a location of the GPS unit as a function of the satellite signals, and a memory coupled with processor and operable to store the distance between the two selected positions.

9. The electronic device as claimed in claim 8, wherein the accelerometer is operable to sense the impact accelerations of the user from the user's motion.

10. An electronic device for determining a distance traveled by a user comprising:

a pedometer operable to sense a step taken by the user;

an accelerometer operable to determine a step size of the user;

a location determining component for determining distance separation information;

a computing device operable to continuously calculate the step size of the user using the distance separation information supplied by the location determining component, such that when the location determining component is operable, the computing device calibrates the step size of the user as determined by the accelerometer, and when the location determining component is inoperable, the step size of the user as determined by the accelerometer and calibrated by the computing device is used to calculate the distance traveled;

a portable housing for storing the pedometer, the accelerometer, the location determining component, and the computing device; and wherein the computing device continuously calculates the step size of the user using the distance separation information supplied by the location determining component by selecting two positions separated by a predetermined value, sensing a number of steps taken between the two positions with the pedometer, determining a distance between the selected two positions with the location determining component, and dividing the distance between the two selected positions by the sensed number of steps taken between the two positions.

11. The electronic device as claimed in claim 10, wherein the computing device calculates the distance traveled by multiplying the number of steps sensed by the pedometer by the step size of the user.

12. The electronic device as claimed in claim 11, wherein the location determining component is a global positioning system ("GPS") device.

13. The electronic device as claimed in claim 12, wherein the GPS device includes a GPS receiver for receiving satellite signals from a plurality of satellites, an antenna coupled with the GPS receiver for facilitating receipt of the satellite signals by the GPS receiver, a processor coupled with the GPS receiver for calculating a location of the GPS unit as a function of the satellite signals, and a memory coupled with processor and operable to store the distance between the two selected positions.

14. The electronic device as claimed in claim 13, wherein the accelerometer is operable to sense the impact accelerations of the user from the user's motion.

15. The electronic device as claimed in claim 14, wherein the computing device is resident in the location determining component.

16. The electronic device as claimed in claim 14, wherein the computing device is resident in the pedometer.

17. The electronic device as claimed in claim 14, wherein the computing device is resident in the accelerometer.

18. The electronic device as claimed in claim 14, wherein the computing device is a stand-alone device separate from the location determining component, the pedometer, and the accelerometer.

19. The electronic device as claimed in claim 14, wherein the housing is sized and configured to be worn on a user's forearm during physical activities.

20. The electronic device as claimed in claim 19, wherein the housing includes a display for displaying the distance traveled.

21. The electronic device as claimed in claim 20, wherein the housing further includes a strap for removably securing the electronic device to the user's body.

22. An electronic device for determining a distance traveled by a user comprising:
a pedometer operable to sense a step taken by the user;
an accelerometer operable to determine a step size of the user;
a location determining component for determining distance separation information;
a computing device operable to continuously calculate the step size of the user using the distance separation information supplied by the location determining component, such that when the location determining component is operable, the computing device calibrates the step size of the user as determined by the accelerometer, and when the location determining component is inoperable, the step size of the user as determined by the accelerometer and calibrated by the computing device is used to calculate the distance traveled;
a temperature sensor for determining a body temperature of the user;
a heart rate monitor operable to determine a heart rate of the user; and
a portable housing for storing the pedometer, the accelerometer, the location determining component, the computing device, and the heart rate monitor; and wherein the computing device continuously calculates the step size of the user using the distance separation information supplied by the location determining component by
selecting two positions separated by a predetermined value,
sensing a number of steps taken between the two positions with the pedometer,
determining a distance between the selected two positions with the location determining component, and
dividing the distance between the two selected positions by the sensed number of steps taken between the two positions.

23. The electronic device as claimed in claim 22, wherein the temperature sensor is stored within the housing.

24. The electronic device as claimed in claim 23, wherein the computing device continuously calculates the step size of the user using the distance separation information supplied by the location determining component by
selecting two positions separated by a predetermined value,
sensing a number of steps taken between the two positions with the pedometer,
determining a distance between the selected two positions with the location determining component, and
dividing the distance between the two selected positions by the sensed number of steps taken between the two positions.

25. The electronic device as claimed in claim 24, wherein the computing device calculates the distance traveled by multiplying the number of steps sensed by the pedometer by the step size of the user.

26. The electronic device as claimed in claim 25, wherein the location determining component is a global positioning system ("GPS") device.

27. The electronic device as claimed in claim 26, wherein the GPS device includes
a GPS receiver for receiving satellite signals from a plurality of satellites,
an antenna coupled with the GPS receiver for facilitating receipt of the satellite signals by the GPS receiver,
a processor coupled with the GPS receiver for calculating a location of the GPS unit as a function of the satellite signals, and
a memory coupled with processor and operable to store the distance between the two selected positions.

28. The electronic device as claimed in claim 27, wherein the accelerometer is operable to sense the impact accelerations of the user from the user's motion.

* * * * *